No. 867,470. PATENTED OCT. 1, 1907.
J. E. BOURNE & O. W. STEVENS.
PNEUMATIC WATER ELEVATOR.
APPLICATION FILED MAY 28, 1906.
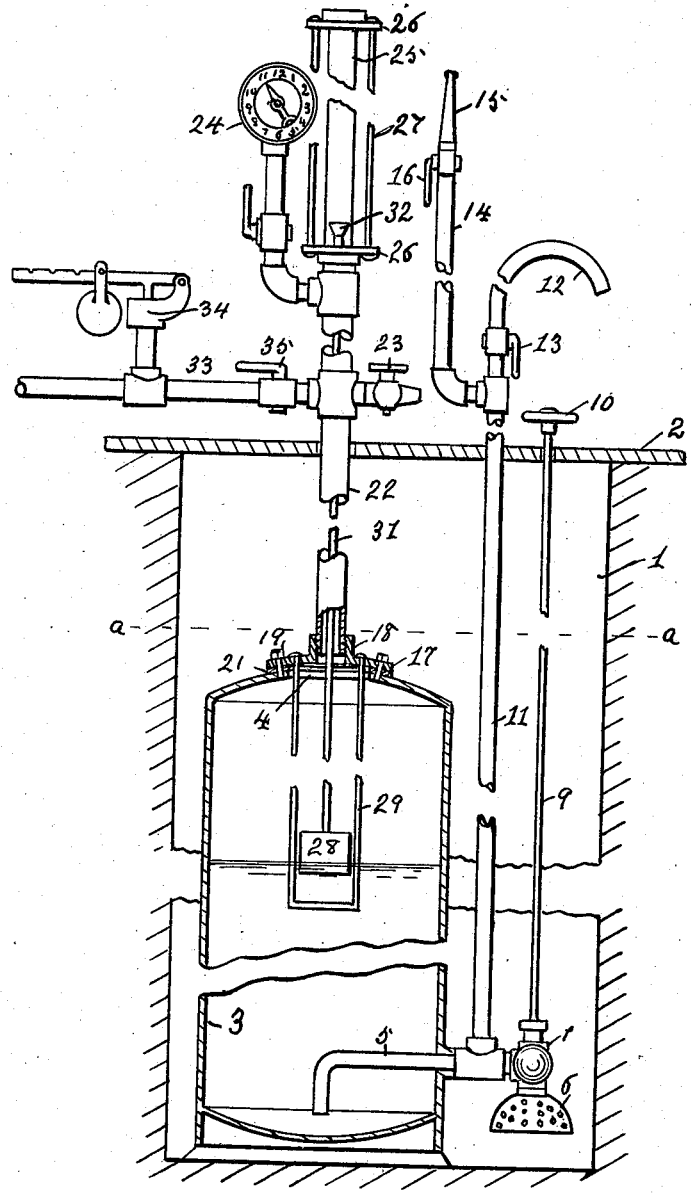
Witnesses,
Ellen A. Rogers
Samuel S. Carr
Inventors,
John E. Bourne and
Orlando W. Stevens,
By Robert S. Carr.
Atty.

UNITED STATES PATENT OFFICE.

JOHN E. BOURNE AND ORLANDO W. STEVENS, OF SOMERVILLE, OHIO; SAID STEVENS ASSIGNOR TO SAID BOURNE.

PNEUMATIC WATER-ELEVATOR.

No. 867,470.     Specification of Letters Patent.     Patented Oct. 1, 1907.

Application filed May 28, 1906. Serial No. 319,015.

*To all whom it may concern:*

Be it known that we, JOHN E. BOURNE and ORLANDO W. STEVENS, citizens of the United States, residing at Somerville, Butler county, Ohio, have invented a new and useful Improvement in Pneumatic Water-Elevators, of which the following is a specification.

Our invention relates to pneumatic water elevators of the class adapted to the use of farmers and others and arranged to deliver water under pressure at a distance and elevation from its source of supply, and the objects of our improvement are to provide a combined water and air tank within a well or cistern whereby the contents of the tank may be maintained at a more uniform temperature; to provide means for the admission or discharge of water therefrom; to provide means for admitting and maintaining a volume of compressed air within said tank; to provide an automatic pressure gage and safety valve, and to provide a simple and durable construction adapted to facilitate its operation and to increase the efficiency of its action. These objects are attained in the following described manner as illustrated in the accompanying drawings, which represent a side elevation with parts in diametrical section of a pneumatic water elevator embodying our improvement.

In the drawings, 1 represents a cistern or well having a variable water level a—a and covered by a platform 2. A pressure tank 3 is either partially or wholly submerged within the cistern and provided with an opening 4 in its top and with a filling pipe 5 near its bottom. Said filling pipe is provided with a strainer 6 and with a valve 7 which is provided with a vertical stem 9, whereby it may be actuated by means of a hand wheel 10 secured thereon above the platform. A vertical discharge pipe 11 terminating above the platform in a goose neck 12 is provided with a stop cock 13 and communicates with the filling pipe 5 between valve 7 thereon and the tank. Delivery pipe or hose 14 leads from the discharge pipe 11 below the stop cock 13 and serves to convey the water to a predetermined distance from the cistern and discharge it from nozzle 15 thereon which is provided with a shut off cock 16.

A removable cover 17 provided with a flanged opening 18 may be removably secured over the opening 4 in the tank by means of bolts 19 and a gasket 21. A vertical air pipe 22 provided with a pet cock 23 and with a pressure gage 24 is secured in flanged opening 18 in the cover and communicates therethrough with the interior of the tank. A glass indicator tube 25 is removably secured on the upper end of said pipe by means of clamps 26 and clamping rods 27.

A float 28 within the tank is vertically movable within a cage 29 which depends therein from cover 17 through opening 4. Said float carries a rod 31 which is movable thereby within the air pipe 22 and terminates in a water level indicator 32 within the glass tube 25 which is visible therethrough to indicate the water level within the tank. An air supply pipe 33 provided with a safety valve 34 and with a straight way cock 35 communicates with the vertical air pipe 22 and with an air compressor (not shown) which may be operated by a wind mill, gasolene engine or other motor or by hand.

In operation, water is admitted from the cistern to the tank through the strainer 6 and valve 7 and the filling pipe and the air displaced thereby is discharged from the tank through the open pet cock 23. When the water in the tank reaches a predetermined level as shown by the indicator in the glass tube, the pet cock and valve 7 should both be closed and straight way cock 35 opened. When the air within the tank above the water level has been compressed by the compressor to a predetermined amount as indicated by the gage or the safety valve, the straight way cock 35 should be closed and the tank is charged and ready for use.

When stop cock 13 is opened the compressed air within the tank will elevate and discharge the water therefrom as desired through the filling pipe 5, the vertical pipe 11 and the goose neck 12, or the water may be conveyed through hose 14 to a predetermined distance and discharged with much force through nozzle 15.

The water in the tank may be maintained under a predetermined pressure as long as desired to be in readiness for use in case of fire which is so destructive to farm buildings. After the water is exhausted from the tank it should be recharged in the manner above described. Owing to the location of the tank within the cistern the water when drawn therefrom is always cool.

Having fully described our improvement what we claim as our invention and desire to secure by Letters Patent of the United States is:—

The combination of a pressure tank provided with an opening in its top and with a filling pipe near its bottom, said filling pipe being provided with a strainer and with a hand actuated inlet valve, a discharge pipe branching from the filling pipe between the valve and the tank and provided with a stop cock, a cover removably secured over the opening, a cage depending therefrom within the tank, a vertical air pipe communicating through the cover with the tank and provided with a pet cock and with a pressure gage, a glass tube closed at one end and removably secured with its other end on the upper extremity of said pipe and in the extended axial line thereof, a float within the cage and provided with a rod which is vertically movable thereby within the air pipe and which rod terminates in an indicator within the glass tube, and an air supply pipe provided with a safety valve and with a lever cock communicating with the vertical air pipe.

JOHN E. BOURNE.
                                ORLANDO W. STEVENS.

Witnesses:
  R. S. CARR,
  L. D. HOUSE.